United States Patent
Ohara

(10) Patent No.: US 8,641,950 B2
(45) Date of Patent: Feb. 4, 2014

(54) MANUFACTURING METHOD OF A PIECE IN A TIRE MOLD FOR MOLDING

(75) Inventor: Masaaki Ohara, Osaka (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 1412 days.

(21) Appl. No.: 11/862,349

(22) Filed: Sep. 27, 2007

(65) Prior Publication Data
US 2008/0099114 A1 May 1, 2008

(30) Foreign Application Priority Data
Oct. 26, 2006 (JP) .................................. 2006-290659

(51) Int. Cl.
- B29C 33/02 (2006.01)
- B29C 33/42 (2006.01)
- B60C 11/03 (2006.01)

(52) U.S. Cl.
USPC ......... 264/219; 83/13; 152/209.2; 152/209.3; 425/28.1

(58) Field of Classification Search
USPC .................. 83/13; 264/219; 152/209.2, 209.3; 425/28.1
See application file for complete search history.

(56) References Cited

U.S. PATENT DOCUMENTS

| 4,411,175 A | * | 10/1983 | Takahashi et al. | ............ 76/107.1 |
| 5,309,964 A | * | 5/1994 | Kogure | ...................... 152/209.2 |
| 6,426,482 B1 | * | 7/2002 | Fike | ......................... 219/121.72 |

FOREIGN PATENT DOCUMENTS

| JP | 55-154145 | * | 12/1980 |
| JP | 62-025016 | * | 2/1987 |
| JP | 63-084894 | * | 4/1988 |
| JP | 09-315110 | * | 12/1997 |
| JP | 10-305713 | | 11/1998 |

OTHER PUBLICATIONS

Machine translation for Japan 09-315110 (no date).*

* cited by examiner

Primary Examiner — Steven D Maki
(74) Attorney, Agent, or Firm — Fish & Richardson P.C.

(57) ABSTRACT

The manufactured pieces are the ones both end surfaces thereof in the tire circumferential direction are cut from the pieces before cutting 1 and the pieces before cutting 1 have the cutting regions whose cross-sectional shapes in the tire width direction are the same at both ends of its circumferential direction. And in the cutting process of cutting the pieces for modifying the lengths in the circumferential direction from each of the pieces before cutting 1, in order that the length in the tire circumferential direction of each piece after cutting and that both of the end surfaces in the circumferential direction of the piece after cutting are included in the cutting regions, the cutting lines of each piece are set at different not less than two positions (a, a' and b, b') in the tire circumferential direction and the pieces are cut by either one of the set cutting lines.

2 Claims, 2 Drawing Sheets a b    a' b'

C

MANUFACTURING METHOD OF A PIECE IN A TIRE MOLD FOR MOLDING

The description of this application claims benefit of priority based on Japanese Patent Application No. 2006-290659, the entire same contents of which are incorporated by reference herein.

BACKGROUND OF THE INVENTION

1. Field of the Invention

The present invention relates to a tire mold for molding a pneumatic tire with so-called variable pitch arrangements, and in more detail, the present invention relates to a manufacturing method of a piece in the tire mold for molding which is a so-called divided-type mold provided with segments that consist of a plurality of pieces.

2. Description of the Prior Art

Tire molds for molding a pneumatic tire include so-called a divided-type mold that has a plurality of segments consisting of a plurality of pieces. In the case of a tread pattern of a general pneumatic tire that has no variable pitches, in the divided-type mold, by manufacturing one kind of pitch that is the basis of the minimum repetition pattern of a tread in one piece or in a group of a plurality of pieces, and by arranging the number of said one piece or a group of a plurality of pieces required for the repeated pitches, the pattern for the whole mold can be manufactured.

However, regarding the tire mold for molding a pneumatic tire that has a tread pattern with so-called variable pitch arrangements, unlike the case of a general tire, conventionally, only manufacturing one kind of pitch could not manufacture the whole tread pattern with variable pitch arrangements. Here, the term "variable pitch arrangements" refer to the arrangements in which the pitch lengths of a repetition unit are changed. Since peak level noise that corresponds to the pitch length is spread over a plurality of frequency components by such arrangements, the generation of noise that is offensive to the ear can be inhibited. Here, the more the kinds of pitches that have different pitch lengths are present, the greater the effect of spreading frequency becomes.

In the tire mold for molding that molds such variable pitch arrangements, when four kinds of variations are imparted, for example, conventionally, four kinds of basic pitches were prepared and these basic pitches were arranged randomly or regularly. However, increasing the number of the basic pitches had the problem of raising the cost of manufacturing the mold including the designing cost and also, it had the problem of increasing operation time. Therefore, some tire molds for molding have been proposed that have variable pitch arrangements with reduced number of the pitches as much as possible. For example, in patent document 1 (Japanese Patent Laid-Open Publication No. Hei 10-305713), two kinds of segments (A and B) with different ratio (a:b) of circumferential lengths (circumferential lengths a and b) from the basic point of the segment (different from the segment referred to in the present application) to both dividing lines are prepared and a technique of manufacturing the tire mold for molding that have four kinds of the pitches (AA, AB, BA, and BB) by the combinations of the segments is shown.

However, by the method of the patent document 1, the lug grooves and the like that extend slightly to the circumferential direction come to have different slant angles to the circumferential direction by having the segments whose ratios of the length in the tire circumferential direction are different. As a result, there arises a problem that the properties originally required for the lug grooves such as drainage property and the like might be damaged. There arises another problem that two kinds of segments should be designed even by the method of the patent document 1.

Moreover, since four kinds of pitches (AA, AB, BA, and BB) are the ones with different lengths in the tire circumferential direction respectively, when one pitch is made into one piece, a plurality of pieces with different lengths in the tire circumferential direction are arranged in each segment. In order to contain each piece in a segment with a predetermined length in the circumferential direction, it is necessary that each piece is manufactured as designed. In other words, when the sum of the lengths of all the pieces of a segment in the circumferential direction is different from the predetermined length in the circumferential direction of the specific segment, the sum of the lengths of all the pieces of the segment in the circumferential direction cannot be modified only by replacing with one of the randomly selected pieces and such modification accompanies large amount of labor.

SUMMARY OF THE INVENTION

In order to solve the above mentioned problems, the present invention has characteristics in that it relates to a manufacturing method of a piece in a tire mold for molding a pneumatic tire provided with a tread pattern that includes pitches with different pitch lengths in the tire circumferential direction of each of the pitches when the minimum repetition pattern unit of a block row repeated in the tire circumferential direction is defined to be one pitch, said tire mold for molding consisting of a plurality of segments divided in the tire circumferential direction and said segments being provided with further divided pieces, wherein said piece is manufactured by cutting both end surfaces in the tire circumferential direction from the piece before cutting and said piece before cutting has cutting regions in both ends in the tire circumferential direction, in said cutting regions, the cross-sectional shapes of said piece in the tire width direction are the same, and in the process of cutting said piece from each said piece before cutting in order to arrange the length of said each piece in the tire circumferential direction to a predetermined length, the cutting lines of each piece are set at not less than different two positions in the tire circumferential direction so that the lengths of each piece after cutting in the tire circumferential direction are equal and that both ends of the piece after cutting in the tire circumferential direction are included in said cutting regions, and said piece is cut from any one of said cutting lines already set.

Although each piece manufactured by the present invention is used for the tire mold for variable pitches, since the piece lengths of each piece in the tire circumferential direction are the same, the pieces can be attached to the segments like tire molds except for the variable pitches, and further, even when any one of the pieces should have defects, it can easily be replaced. Further, according to the manufacturing method of the pieces of the present invention, the tire mold for molding with variable pitch arrangements can be obtained even from one piece before cutting that forms the basis of the repeated pattern. Consequently, the cost for designing the mold can greatly be reduced.

Since the manufacturing method of the pieces of the present invention can be incorporated into the cutting process of cutting both ends of the pieces before cutting in the tire circumferential direction and manufacturing the pieces that is generally conducted for the purpose of arranging the length of each piece in the tire circumferential direction to the predetermined length, there is no extra process required to be added. In addition, the kinds of variable pitches can be increased simply by increasing the number of setting of the cutting lines that cut both ends of the pieces before cutting in the tire circumferential direction. Consequently, the tire mold for molding pneumatic tires with many kinds of variable pitches can be manufactured with inhibited rise in cost.

Further, since the angles of the lug grooves and the like slanted to the circumferential direction need not be changed depending on the pieces in the pneumatic tires molded by the tire mold for molding that uses the pieces manufactured by the manufacturing method of the present invention, a noise-preventive effect can be obtained by the variable pitches without sacrificing a drainage property of the lug grooves.

DESCRIPTION OF THE PREFERRED EMBODIMENTS

Hereinafter, although the explanation is made using drawings, the present invention is not limited to the embodiments shown by these drawings.

The present invention relates to a manufacturing method of pieces that are used for segments of a tire mold consisting of a plurality of segments divided in the tire circumferential direction and provided with a further divided piece, or the present invention relates to a manufacturing method of the pieces used for the segments of a so-called divided type mold for molding.

Also, the tire that is vulcanized and molded by the tire mold for molding provided with the pieces manufactured by the present invention is the pneumatic tire provided with a tread pattern that includes pitches with different pitch lengths in the tire circumferential direction of said each piece when the minimum repetition pattern unit of the block row repeated in the tire circumferential direction is defined as one pitch, or the pneumatic tire with so-called variable pitch arrangements.

In other words, to simply put, the present invention relates to a manufacturing method of a piece used for a divided-mold type mold for molding the pneumatic tire with variable pitch arrangements and also, the present invention relates to a tire mold for molding provided with said piece and further, to the pneumatic tire vulcanized and molded using said mold.

Figure 1:
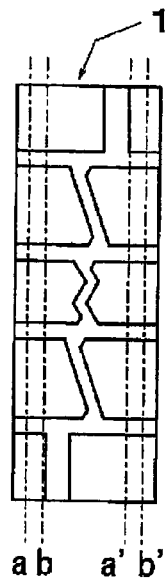
FIG. 1 is a view showing one example of a pattern molded surface of the piece before cutting used in the present invention.
Figure 2:
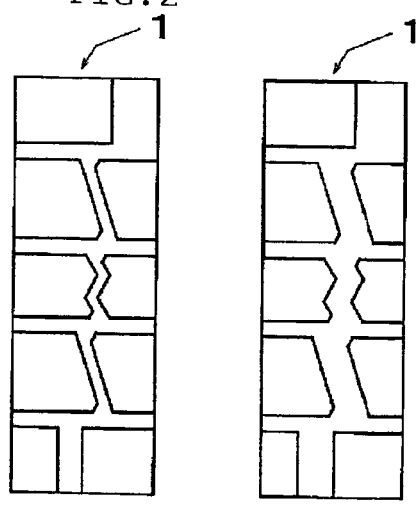
FIG. 2 is a view showing another example of a pattern molded surface of the piece before cutting used in the present invention.

In the manufacturing method of the pieces of the present invention, the piece before cutting 1 whose length in the tire circumferential direction is somewhat longer than that of the final piece is molded and by cutting the both ends of the piece in the circumferential direction, the piece is manufactured. FIGS. 1 and 2 show the examples of pattern molded surfaces of the pieces before cutting.

In the present invention, cutting regions C are provided on both ends in the circumferential direction of the piece before cutting 1. In the cutting regions C, the cross-sectional shapes in the tire width direction are the same. In other words, no protrusion is provided for molding the lug grooves and the like that extend in the tire width direction or in the oblique direction in the cutting regions C. Therefore, the protrusions for forming the lug grooves and the like are provided at regions other than the cutting regions C (non-cutting regions).

Here, the tread pattern provided in the non-cutting regions is not particularly restricted. However, in the tread pattern of the tires molded by the mold of the present invention, the pattern provided in the non-cutting regions are repeated. The pattern appearing in the non-cutting regions becomes one pitch or when n patterns are repeated in the non-cutting regions (where n is an integer not less than 2), the patterns become n pitches.

Figure 3:
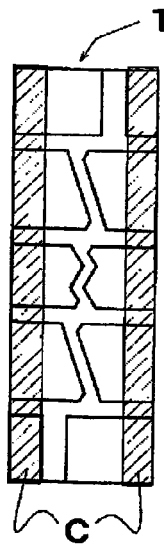
FIG. 3 is a view showing the cutting region by hatched lines of the piece before cutting in the embodiment of FIG. 1.

FIG. 3 shows the cutting regions C by the oblique line in the piece before cutting 1 in the embodiment of FIG. 1. With such cutting regions C, regardless of the position of the cutting lines to arrange the pieces with the end surface thereof in the tire circumferential direction cut in the segment, the cutting regions can be continued with the adjacent pieces in respect of the pattern shapes forming the tread of the pieces.

However, the cutting regions C include marginal regions other than the regions for making the tread pattern have variable pitches. The marginal regions are the regions that require cutting for the purpose of accurately arranging the piece lengths in the tire circumferential direction to predetermined lengths and making the shapes of the end surfaces flat with no deformation, and also, the marginal regions are the regions required in the general piece manufacturing processes. The length in the tire circumferential direction required for securing these marginal regions is at least 1 mm. Therefore, in the manufacturing method of the present invention, it is preferable that the cutting lines of the pieces are not provided in the range within 1 mm from the both ends of the piece before cutting 1 in the tire circumferential direction.

On the other hand, the length in the tire circumferential direction required for securing the regions in order to make the tread pattern with variable pitches is the width that is 10 to 15% with respect to the pitch length of the designed pitches. Since the pitch length is preferably not less than 20 mm in general even when the pitch is short, the lengths in the tire circumferential direction of the cutting regions C minimally required are 1+20×10%=3 mm, respectively. On the other hand, since the one with long pitch lengths has about 60 mm in length at the maximum, the lengths in the tire circumferential direction of the preferable cutting regions C maximally required are 1+60×15%=10 mm, respectively. Although no problem arises when the lengths in the tire circumferential direction of the cutting regions C that exceed 10 mm are provided, in general, it is not cost effective since the marginal regions increase. From the above, the preferable lengths in the tire circumferential direction of the cutting regions C are 3 to 10 mm, respectively. In addition, since the preferable lengths in the tire circumferential direction of the cutting regions C depend on the pitch lengths, when the pitch lengths are not within the range of 20 to 60 mm, the preferable lengths in the tire circumferential direction of the cutting regions C change, too.

As shown in FIG. 1, even with one kind of piece before cutting 1, the tire mold for molding that uses the piece manufactured by cutting both ends of the piece before cutting 1 in the tire circumferential direction can be made for the variable pitch arrangements. On the other hand, two or more kinds of pieces before cutting 1 are available. In this case, as mentioned above, the pattern of the non-cutting regions is not restricted as long as the cross-sectional shapes in the tire width direction of the cutting regions C are the same.

However, for example, when the two pieces before cutting with greatly different patterns are manufactured, in arranging each piece after cutting in segments, it is necessary that the piece that is adjacent to the piece manufactured by cutting the both ends of one piece before cutting 1 in the circumferential direction is arranged with a piece manufactured by cutting the both ends of the other piece before cutting 1 in the circumferential direction. On the other hand, when the two kinds of pieces before cutting 1 with two patterns in which only the lug groove width is changed as shown in FIG. 2 are manufactured, each piece can randomly be arranged.

The manufacturing method of the pieces before cutting 1 in the present invention can utilize the general manufacturing method of molds and is not specifically restricted. For example, the pieces before cutting 1 can be manufactured by a plaster-molding method. In the plaster-molding method, generally, a rubber mold (reverse mold) that has the pattern with reversed concavities and convexities compared with a tread pattern is manufactured first, followed by casting a plaster into the rubber mold, thereby manufacturing the plaster mold (normal mold). And then, by casting metals such as aluminum and the like into the plaster mold, the tire molds for molding are manufactured.

When the pieces are manufactured by such a plaster molding method, deformations or dimensional defects are generated due to contraction of the molds in molding the pieces. Therefore, in general, the marginal regions are provided beforehand on both ends of the pieces before cutting in the circumferential direction and after molding, the process of the post treatment (cutting process) of cutting the marginal regions to make complete pieces is provided. Since the cutting process of manufacturing said pieces from each of the pieces before cutting in the present invention can utilize the conventional cutting process, in carrying out the manufacturing method of the pieces of the present invention, it requires substantially no new apparatus or spaces.

Pieces 2A and 2B are manufactured from the piece before cutting 1 by the following method.

First, each of the pieces 2A and 2B after cutting are set to have the same lengths thereof in the tire circumferential direction. This is for arranging the lengths of each of the cut pieces in the tire circumferential direction to predetermined lengths. Further, in the cutting regions, setting is so made that the ends (a, a', b, and b') in the circumferential direction of the pieces after cutting are included in the cutting regions. This is for making the pattern shapes of the both end surfaces in the tire circumferential direction of each of the cut pieces into constant shapes. Therefore, it is necessary that both ends (a, a', b, and b') of the piece in the tire circumferential direction to be cut are positioned in the cutting regions. Also, the cutting lines are set so that the marginal regions are cut in the cutting process.

At least two cutting lines that meet the above mentioned condition are set in the different positions in the tire circumferential direction. The piece before cutting of FIG. 1 shows each of the cutting lines (a, a' and b, b') of two kinds of pieces 2A and 2B in a dot-dashed line. Each piece is cut from any one of the positions (to take the example of FIG. 1, either of a-a' or b-b') of the cutting lines already set. It is preferable that the number of pieces cut by the already set cutting lines is substantially equal. For example, in the embodiment of FIG. 1, it is preferable that the number of the pieces that are cut at lines a and a' and the number of the pieces that are cut at lines b and b' are substantially the same.

Figure 4:
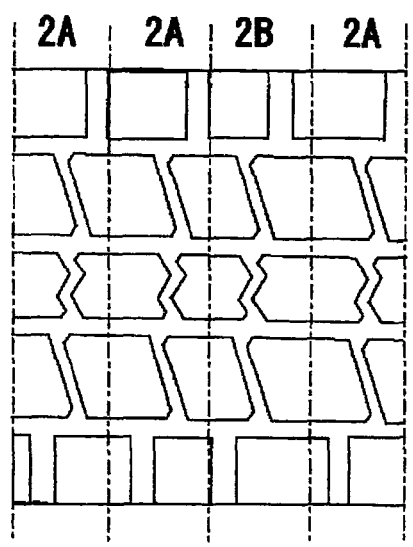
FIG. 4 is a pattern view in which the pieces manufactured by the manufacturing method of the present invention are arranged.

The tire mold for molding in which the pieces cut by the above mentioned method are arranged in the segments becomes the tire mold for molding with so-called variable pitch arrangements. FIG. 4 is a pattern view in which the two kinds of pieces (2A and 2B) manufactured by the manufacturing method of the present invention are arranged using the pieces before cutting 1 as shown in FIG. 1. Regarding the arrangement methods of the pieces, although they can be arranged regularly, it is preferable that they are arranged randomly for the purpose of reducing peak noise. By selecting random arrangements, even when one piece should have defects, when it is replaced without investigating by which cutting line the replacement piece is cut, the randomness of the variable arrangements is not lost and therefore, the defected piece can easily be replaced.

What is claimed is:

1. A manufacturing method of pieces in a tire mold for molding a pneumatic tire provided with a tread pattern that includes pitches with different pitch lengths in the tire circumferential direction of each of the pitches when the minimum repetition pattern unit of a block row repeated in the tire circumferential direction is defined to be one pitch, said tire mold for molding consisting of a plurality of segments divided in the tire circumferential direction and said segments being provided with a plurality of manufactured said pieces, wherein each of said pieces is manufactured by cutting both end surfaces in the tire circumferential direction from one of the pieces before cutting and said pieces before cutting have cutting regions in both ends in the tire circumferential direction, in said cutting regions, the cross-sectional shapes of said pieces before cutting in the tire width direction are the same, and in the process of manufacturing each of said pieces by cutting one of said pieces before cutting in order to arrange the length of each of said manufactured pieces in the tire circumferential direction to a predetermined length, pairs of cutting lines of each of said pieces before cutting are set at not less than two different positions in the tire circumferential direction so that the length of each of manufactured said pieces in the tire circumferential direction is equal and that both ends of each of manufactured said pieces in the tire circumferential direction are included in said cutting regions, and each of manufactured said pieces is cut from one of said pairs of cutting lines already set, with at least some of manufactured said pieces being prepared by cutting respective first pairs of cutting lines of some of said pieces before cutting and at least others of manufactured said pieces being prepared by cutting respective second pairs of cutting lines of others of said pieces before cutting.

2. The manufacturing method of the pieces in the tire mold for molding as set forth in claim 1, wherein the lengths in the tire circumferential direction of said cutting regions are 3 to 10 mm, respectively.

\* \* \* \* \*